(12) United States Patent
Aratani et al.

(10) Patent No.: US 12,037,655 B2
(45) Date of Patent: Jul. 16, 2024

(54) ELECTRIC RESISTANCE WELDED STEEL PIPE OR TUBE

(71) Applicant: JFE STEEL CORPORATION, Tokyo (JP)

(72) Inventors: Masatoshi Aratani, Tokyo (JP); Ryoji Matsui, Tokyo (JP); Tomonori Kondou, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 546 days.

(21) Appl. No.: 17/415,730

(22) PCT Filed: Sep. 18, 2019

(86) PCT No.: PCT/JP2019/036550
§ 371 (c)(1),
(2) Date: Jun. 18, 2021

(87) PCT Pub. No.: WO2020/129337
PCT Pub. Date: Jun. 25, 2020

(65) Prior Publication Data
US 2021/0310091 A1    Oct. 7, 2021

(30) Foreign Application Priority Data

Dec. 19, 2018    (JP) .................. 2018-237698

(51) Int. Cl.
*C21D 9/08*    (2006.01)
*C21D 8/10*    (2006.01)
(Continued)

(52) U.S. Cl.
CPC .............. *C21D 9/085* (2013.01); *C21D 8/10* (2013.01); *C21D 9/0012* (2013.01); *C21D 9/505* (2013.01);
(Continued)

(58) Field of Classification Search
None
See application file for complete search history.

(56) References Cited

U.S. PATENT DOCUMENTS

2009/0250146 A1* 10/2009 Ishitsuka .............. B60G 21/055
148/330
2020/0332381 A1    10/2020 Kawabata et al.

FOREIGN PATENT DOCUMENTS

EP         3476953 A1    5/2019
JP       H06336646 A    12/1994
(Continued)

OTHER PUBLICATIONS

Machine translation of JP 2007-056283A. (Year: 2007).*
Dec. 24, 2019, International Search Report issued in the International Patent Application No. PCT/JP2019/036550.

*Primary Examiner* — Xiaowei Su
(74) *Attorney, Agent, or Firm* — KENJA IP LAW PC

(57) ABSTRACT

Provided is an electric resistance welded steel pipe or tube that develops no quench cracks despite having carbon content of 0.40% or more and has excellent fatigue strength. An electric resistance welded steel pipe or tube comprises: a chemical composition containing, in mass %, C: 0.40% to 0.55%, Si: 0.10% to 1.0%, Mn: 0.10% to 2.0%, P: 0.10% or less, S: 0.010% or less, Al: 0.010% to 0.100%, Cr: 0.05% to 0.30%, Ti: 0.010% to 0.050%, B: 0.0005% to 0.0030%, Ca: 0.0001% to 0.0050%, and N: 0.0005% to 0.0050%, with a balance consisting of Fe and inevitable impurities; and a ferrite decarburized layer at each of an outer surface and an inner surface, the ferrite decarburized layer having a depth of 20 μm to 50 μm from the surface.

8 Claims, 1 Drawing Sheet

(51) Int. Cl.
 *C21D 9/00* (2006.01)
 *C21D 9/50* (2006.01)
 *C22C 38/00* (2006.01)
 *C22C 38/02* (2006.01)
 *C22C 38/42* (2006.01)
 *C22C 38/58* (2006.01)
(52) U.S. Cl.
 CPC ............ *C22C 38/005* (2013.01); *C22C 38/02* (2013.01); *C22C 38/42* (2013.01); *C22C 38/58* (2013.01); *C21D 2211/001* (2013.01); *C21D 2211/005* (2013.01)

(56) References Cited

FOREIGN PATENT DOCUMENTS

| | | | |
|---|---|---|---|
| JP | 2007056283 A | * | 3/2007 |
| JP | 2007119865 A | | 5/2007 |
| JP | 2007204798 A | | 8/2007 |
| JP | 2007270349 A | | 10/2007 |
| WO | 2018079398 A1 | | 5/2018 |
| WO | 2019131813 A1 | | 7/2019 |

* cited by examiner

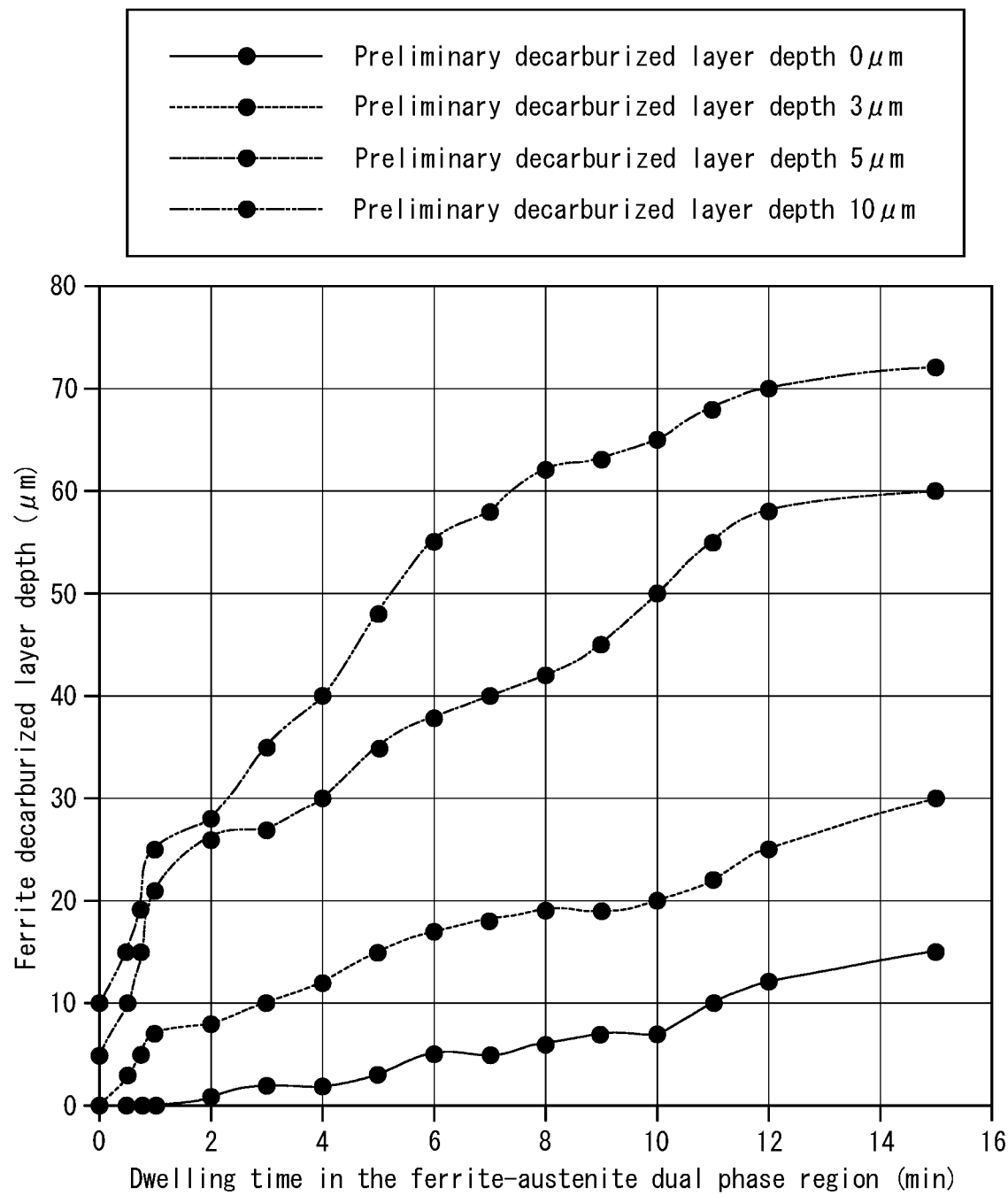

ELECTRIC RESISTANCE WELDED STEEL PIPE OR TUBE

TECHNICAL FIELD

The present disclosure relates to an electric resistance welded steel pipe or tube, and particularly relates to an electric resistance welded steel pipe or tube that develops no quench cracks despite having carbon content of 0.40 mass % or more.

BACKGROUND

Steel bars are conventionally used in automotive parts required to have high rigidity, such as drive shafts and steering shafts. In recent years, however, steel pipes or tubes are increasingly used instead of steel bars in order to reduce weight while maintaining rigidity.

In the case of using a steel pipe or tube in parts that need high torsional torque such as a drive shaft, the steel pipe or tube is subjected to quenching and tempering in order to ensure required strength. If the strength of the steel pipe or tube can be enhanced by quenching, the required strength can be ensured with a thinner steel pipe or tube, which is advantageous in terms of weight reduction. From the viewpoint of enhancing the strength of the steel pipe or tube after the quenching, the carbon content in the steel is desirably high. There is thus a tendency to use steel pipes or tubes high in carbon content.

It is known that surface cracks called quench cracks occur when steel material is quenched. In detail, when the steel material is rapidly cooled from red heat, initially compressive residual stress is generated in the surface layer of the steel material due to thermal stress, and therefore no cracks occur. When the steel material is cooled to a temperature range of Ms (martensite transformation start) point or less, however, the steel material undergoes volume expansion as a result of martensite transformation, and tensile stress is generated in the surface layer of the steel material. This causes quench cracks on the surface. Since the tensile stress resulting from the martensite transformation is greater when the carbon content is higher, a steel material higher in carbon content is more susceptible to quench cracks. Quench cracks are particularly noticeable in the case where the carbon content is 0.40 mass % or more. Quench cracks have significantly adverse impact on the static strength and the fatigue strength required of parts, and accordingly need to be prevented.

Various techniques are proposed to prevent quench cracks in high carbon steel materials.

For example, JP H06-336646 A (PTL 1) proposes a technique of adding more than 2 mass % Si to induction hardening steel used in automotive parts and the like to enhance temper softening resistance. With this technique, required torsional performance is ensured by enhancing the temper softening resistance, and thus the C content can be reduced to 0.60 mass % or less. Hence, quench cracks and a decrease in workability can be prevented.

JP 2007-204798 A (PTL 2) proposes a technique of, after working a steel material into a part shape and immediately before quenching the steel material, subjecting the steel material to induction hardening and to forced cooling on the site where quench cracks tend to occur. With this technique, when the temperature of the site reaches Ar1 point to (Ar1−50) ° C., the forced cooling is stopped and the site is caused to recuperate to Ac1 point or higher. This suppresses coarsening of prior austenite grain size in the quenched microstructure, and improves quench crack resistance.

CITATION LIST

Patent Literatures

PTL 1: JP H06-336646 A
PTL 2: JP 2007-204798 A

SUMMARY

Technical Problem

However, the technique proposed in PTL 1 is intended for round bars, and not intended for electric resistance welded steel pipes or tubes. In the case where more than 2 mass % Si is added to a material for electric resistance welded steel pipes or tubes as proposed in PTL 1, electric resistance weldability is impaired considerably, making it difficult to ensure weld quality.

The technique proposed in PTL 2 is also intended for steel bars, and not intended for electric resistance welded steel pipes or tubes. Moreover, this technique needs a quenching line capable of highly accurate controlled cooling to ensure appropriate prior austenite grain size.

Thus, there are conventionally no electric resistance welded steel pipes or tubes that satisfy two conflicting demands, i.e., improving fatigue strength by high carbon content and preventing quench cracks.

It could therefore be helpful to provide an electric resistance welded steel pipe or tube that develops no quench cracks despite having carbon content of 0.40 mass % or more and has excellent fatigue strength.

Solution to Problem

As a result of conducting study, we discovered the following.

(1) By providing a ferrite decarburized layer (also referred to as "complete decarburized layer") of a specific depth in a surface layer of a steel pipe or tube before quenching, quench cracks can be prevented. In detail, during quenching, the inside undergoes martensite transformation, and tensile stress is generated in the surface layer. The ferrite decarburized layer in the surface layer, however, remains ferrite even when quenching is performed. Since ferrite is a soft and easily extendable microstructure, no quench cracks occur.

(2) By limiting the depth of the ferrite decarburized layer (also referred to as "ferrite decarburized layer depth") to a specific range, a decrease in fatigue strength caused by insufficient quenching of the surface layer can be prevented.

(3) By employing such a heating and rolling schedule that holds the steel pipe or tube in an austenite-ferrite (γ-α) dual phase region as long as possible in hot diameter-reducing rolling, a ferrite decarburized layer with an optimal thickness can be formed.

An example of experiment conducted to make these discoveries will be described below. The following experiment was conducted to evaluate how the ferrite decarburized layer depth in the electric resistance welded steel pipe or tube influences the occurrence of quench cracks and the post quenching-tempering fatigue strength.

First, electric resistance welded steel pipes or tubes (outer diameter: 40 mm, thickness: 4 mm) having C content of 0.41 mass % and different ferrite decarburized layer depths were prepared as samples. Each electric resistance welded steel pipe or tube was subjected to induction water quenching at a cooling rate of 50° C./s, and whether quench cracks occurred was evaluated. The evaluation results are listed in Table 1.

Further, the electric resistance welded steel pipe or tube after the induction water quenching was tempered at 400° C. for 20 min. After this, a torsional fatigue test was conducted to evaluate the fatigue strength of the electric resistance welded steel pipe or tube after the tempering. For the evaluation of the fatigue strength, a reference sample from which effects such as microcracks on the surface and surface decarburization were completely removed was produced by grinding the electric resistance welded steel pipe or tube after the tempering in the depth direction from each of the inner surface and the outer surface by 0.5 mm. Each sample whose fatigue strength was not more than 80% of that of the reference sample was evaluated as having insufficient fatigue strength. The evaluation results are listed in Table 1.

The results in Table 1 revealed the following: Quench cracks occurred in the case where the ferrite decarburized layer depth was less than 20 μm, but did not occur in the case where the ferrite decarburized layer depth was 20 μm or more. In the case where the ferrite decarburized layer depth was more than 50 μm, no quench cracks occurred but the fatigue strength was poor. This is because the presence of the thick ferrite decarburized layer caused insufficient quenching hardness of the surface layer. Although one way of ensuring the fatigue strength is to cut the decarburized portion of the surface layer, this leads to lower productivity and significantly higher costs. It is therefore important to limit the ferrite decarburized layer depth to 20 μm to 50 μm.

TABLE 1

| Ferrite decarburized layer depths (μm) | Quench crack | Remarks |
| --- | --- | --- |
| 0 | Occurred | Insufficient fatigue strength |
| 1 | Occurred | Insufficient fatigue strength |
| 3 | Occurred | Insufficient fatigue strength |
| 5 | Occurred | Insufficient fatigue strength |
| 7 | Occurred | Insufficient fatigue strength |
| 10 | Occurred | Insufficient fatigue strength |
| 15 | Occurred | Insufficient fatigue strength |
| 20 | Not occurred | |
| 22 | Not occurred | |
| 40 | Not occurred | |
| 48 | Not occurred | |
| 53 | Not occurred | Insufficient fatigue strength |
| 65 | Not occurred | Insufficient fatigue strength |
| 70 | Not occurred | Insufficient fatigue strength |
| 90 | Not occurred | Insufficient fatigue strength |
| 105 | Not occurred | Insufficient fatigue strength |

FIG. 1 is a graph illustrating the relationship between the dwelling time in the ferrite-austenite dual phase region in an electric resistance welded steel pipe or tube production process including hot diameter-reducing rolling and the ferrite decarburized layer depth at the surface of each obtained electric resistance welded steel pipe or tube. Herein, the term "dwelling time in the ferrite-austenite dual phase region" denotes the time during which the steel pipe or tube as material was in an austenite-ferrite (γ-α) dual phase region during the hot diameter-reducing rolling and the subsequent cooling. FIG. 1 illustrates experimental results corresponding to the following four conditions: the depth of a preliminary decarburized layer (also referred to as "preliminary decarburized layer depth") before the hot diameter-reducing rolling being 0 μm, 3 μm, 5 μm, and 10 μm. In FIG. 1, the lowest line is a plot corresponding to the preliminary decarburized layer depth of 0 μm, and the highest line is a plot corresponding to the preliminary decarburized layer depth of 10 μm. Herein, the term "preliminary decarburized layer" denotes a total decarburized layer formed as a result of heating before the diameter-reducing rolling. The preliminary decarburized layer depth can be measured after the steel pipe or tube after the heating and before the diameter-reducing rolling is rapidly cooled so as not to be decarburized any more.

As can be understood from the results in FIG. 1, in the case where the preliminary decarburized layer depth is less than 5 μm, a ferrite decarburized layer with a depth of 20 μm or more is not obtained unless the dwelling time in the ferrite-austenite dual phase region is 10 min or more. In the case where the preliminary decarburized layer depth is 5 μm or more, a ferrite decarburized layer depth of 20 μm to 50 μm is achieved with a dwelling time 15 in the ferrite-austenite dual phase region of 1 min to 5 min.

If the heat treatment for holding the steel pipe or tube in the dual phase region is performed off-line, a sufficient dwelling time in the ferrite-austenite dual phase region can be ensured and a ferrite decarburized layer depth of 20 μm to 50 μm can be achieved regardless of the preliminary decarburized layer depth. However, such off-line heat treatment is not desirable because the productivity decreases and the costs increase. By forming the preliminary decarburized layer of the appropriate depth in advance before the steel pipe or tube enters the dual phase region in the cooling process after the diameter-reducing rolling, the necessary ferrite decarburized layer depth can be achieved even in the case where the dwelling time in the ferrite-austenite dual phase region is 5 min or less. This is because, if the C content in the surface layer is low, a temperature range in which ferrite decarburization progresses particularly easily in the dual phase region widens. In detail, ferrite decarburization progresses only in the dual phase region. In particular, ferrite decarburization progresses easily in a high temperature range in the dual phase region. In the case where the preliminary decarburized layer is formed at the surface, the C content in this part is low, and accordingly the upper-limit temperature of the dual phase region increases and the dual phase region widens to the high temperature side. Consequently, owing to the presence of the preliminary decarburized layer, the subsequent ferrite decarburization progresses favorably and the desired ferrite decarburized layer depth is achieved in a short time. With such a short dwelling time in the ferrite-austenite dual phase region, on-line production is possible. Thus, an electric resistance welded steel pipe or tube according to the present disclosure can be efficiently produced on-line.

The present disclosure is based on these discoveries. We thus provide the following.

1. An electric resistance welded steel pipe or tube comprising: a chemical composition containing (consisting of), in mass %, C: 0.40% to 0.55%, Si: 0.10% to 1.0%, Mn: 0.10% to 2.0%, P: 0.10% or less, S: 0.010% or less, Al: 0.010% to 0.100%, Cr: 0.05% to 0.30%, Ti: 0.010% to 0.050%, B: 0.0005% to 0.0030%, Ca: 0.0001% to 0.0050%, and N: 0.0005% to 0.0050%, with a balance consisting of Fe and inevitable impurities; and a ferrite decarburized layer at each of an outer surface and an inner surface, the ferrite decarburized layer having a depth of 20 μm to 50 μm from the surface.
2. The electric resistance welded steel pipe or tube according to 1., wherein the chemical composition further contains, in mass %, one or both of Cu: 1.0% or less and Ni: 1.0% or less.
3. The electric resistance welded steel pipe or tube according to 1. or 2., wherein the chemical composition further contains, in mass %, one or more selected from the group consisting of Nb: 0.05% or less, W: 0.5% or less, V: 0.50% or less, and Mo: 2.0% or less.
4. The electric resistance welded steel pipe or tube according to any one of 1. to 3., wherein the chemical composition further contains, in mass %, REM: 0.020% or less.

Advantageous Effect

It is thus possible to provide an electric resistance welded steel pipe or tube that develops no quench cracks despite having carbon content of 0.40% or more. The electric resistance welded steel pipe or tube according to the present disclosure has excellent productivity. The electric resistance welded steel pipe or tube according to the present disclosure is suitable for use in production of automotive parts and the like.

BRIEF DESCRIPTION OF THE DRAWINGS

In the accompanying drawings:
FIG. 1 is a graph illustrating the relationship between the dwelling time in the ferrite-austenite dual phase region in an electric resistance welded steel pipe or tube production process including hot diameter-reducing rolling and the ferrite decarburized layer depth at the surface of each obtained electric resistance welded steel pipe or tube.

DETAILED DESCRIPTION

A method for carrying out the presently disclosed techniques will be described in detail below.
[Chemical Composition]
An electric resistance welded steel pipe or tube according to one of the disclosed embodiments has the foregoing chemical composition. Each component included in the chemical composition will be described below. Herein, "%" as the unit of content of each component denotes "mass %" unless otherwise specified.
C: 0.40% to 0.55%
If the C content is less than 0.40%, sufficient hardness cannot be achieved even when quenching is performed, and required fatigue resistance cannot be achieved. The C content is therefore 0.40% or more, and preferably 0.41% or more. If the C content is more than 0.55%, the weldability degrades, making it impossible to achieve stable electric resistance weld quality. The C content is therefore 0.55% or less, and preferably 0.50% or less.
Si: 0.10% to 1.0%
Si is added for deoxidation in some cases. If the Si content is less than 0.10%, the deoxidation effect is insufficient. Si is also a solid-solution-strengthening element. To achieve this effect, the Si content needs to be 0.10% or more. The Si content is therefore 0.10% or more. If the Si content is more than 1.0%, the hardenability of the steel pipe or tube decreases. The Si content is therefore 1.0% or less, and preferably 0.4% or less.

Mn: 0.10% to 2.0%
Mn is an element that improves the hardenability. To achieve this effect, the Mn content needs to be 0.10% or more. The Mn content is therefore 0.10% or more, preferably 0.20% or more, and more preferably 1.0% or more. If the Mn content is more than 2.0%, the electric resistance weld quality decreases. The Mn content is therefore 2.0% or less, and preferably 1.8% or less.
P: 0.10% or Less
P is an element contained as an impurity, and segregates to grain boundaries and the like and adversely affects the weld cracking resistance and the toughness. The P content is therefore reduced to 0.10% or less. The P content is preferably 0.05% or less. Although no lower limit is placed on the P content, the P content may be 0.001% or more because P is inevitably contained in the steel.
S: 0.010% or Less
S is an element that exists as a sulfide inclusion in the steel and causes decreases in hot workability, toughness, and fatigue resistance. Accordingly, the S content needs to be reduced to 0.010% or less. The S content is preferably 0.005% or less. Although no lower limit is placed on the S content, the S content may be 0.001% or more because S is inevitably contained in the steel.
Al: 0.010% to 0.100%
Al is an element effective in deoxidation. Al also has an effect of inhibiting the growth of austenite grains during quenching to ensure the strength after the quenching. To achieve these effects, the Al content is 0.010% or more, and preferably 0.030% or more. If the Al content is more than 0.100%, not only the effects are saturated, but also Al-based inclusions increase and the fatigue strength decreases. The Al content is therefore 0.100% or less, and preferably 0.080% or less.
Cr: 0.05% to 0.30%
Cr is an element that has an effect of improving the hardenability. To achieve this effect, the Cr content is 0.05% or more, and preferably 0.10% or more. If the Cr content is more than 0.30%, oxide tends to form, and Cr oxide remains in the electric resistance weld portion and decreases the electric resistance weld quality. The Cr content is therefore 0.30% or less, and preferably 0.25% or less.
Ti: 0.010% to 0.050%
Ti has an action of fixing N in the steel as TiN. If the Ti content is less than 0.010%, the ability to fix N is insufficient. The Ti content is therefore 0.010% or more. If the Ti content is more than 0.050%, the workability and toughness of the steel decrease. The Ti content is therefore 0.050% or less, and preferably 0.040% or less.
B: 0.0005% to 0.0030%
B is an element that improves the hardenability. If the B content is less than 0.0005%, the hardenability improving effect is insufficient. The B content is therefore 0.0005% or more, and preferably 0.0010% or more. If the B content is more than 0.0030%, not only the effect is saturated, but also B segregates to grain boundaries and facilitates intergranular fractures, which degrades the toughness. The B content is therefore 0.0030% or less, and preferably 0.0025% or less.
Ca: 0.0001% to 0.0050%
Ca is an element that makes nonmetallic inclusions spherical in form and is effective in reducing crack initiation points upon fatigue fracture in such a use environment in which stress is applied repeatedly. To achieve this effect, the Ca content is 0.0001% or more, and preferably 0.0010% or more. If the Ca content is more than 0.0050%, the amount of inclusions increases excessively, and the cleanliness decreases. The Ca content is therefore 0.0050% or less, and preferably 0.0040% or less.

N: 0.0005% to 0.005%

N is an element that has an effect of combining with Al and refining crystal grains. To achieve this effect, the N content is 0.0005% or more, and preferably 0.0010% or more. If the N content is more than 0.0050%, N combines with B and forms BN, as a result of which the amount of free B decreases. This hinders the hardenability improving effect by B. The N content is therefore 0.0050% or less, and preferably 0.0040% or less.

The chemical composition according to one of the disclosed embodiments contains the elements described above, with the balance consisting of Fe and inevitable impurities.

In another one of the disclosed embodiments, the chemical composition may optionally further contain one or both of Cu and Ni in the respective amounts described below.

Cu: 1.0% or Less

Cu is an element that improves the hardenability, and is effective in improving the strength and fatigue strength of the steel. If the Cu content is more than 1.0%, the workability decreases considerably. Accordingly, in the case of adding Cu, the Cu content is 1.0% or less, and preferably 0.5% or less. Although no lower limit is placed on the Cu content, the Cu content is preferably 0.001% or more from the viewpoint of achieving sufficient effect by addition of Cu.

Ni: 1.0% or Less

Ni is an element that improves the hardenability, and is effective in improving the strength of the steel. If the Ni content is more than 1.0%, the workability decreases considerably. Accordingly, in the case of adding Ni, the Ni content is 1.0% or less, and preferably 0.5% or less. Although no lower limit is placed on the Ni content, the Ni content is preferably 0.1% or more from the viewpoint of achieving sufficient effect by addition of Ni.

In another one of the disclosed embodiments, the chemical composition may optionally further contain one or more selected from the group consisting of Nb, W, V, and Mo in the respective amounts described below.

Nb: 0.05% or Less

Nb is an element that improves the hardenability, and also forms carbide and contributes to higher strength. If the Nb content is more than 0.05%, not only the effect is saturated, but also the workability decreases. Accordingly, in the case of adding Nb, the Nb content is 0.05% or less, and preferably 0.04% or less. Although no lower limit is placed on the Nb content, the Nb content is preferably 0.001% or more and more preferably 0.002% or more from the viewpoint of achieving sufficient effect by addition of Nb.

W: 0.5% or Less

W is an element that has an effect of improving the strength of the steel by forming carbide. If the W content is more than 0.5%, unnecessary carbide precipitates, and the fatigue resistance and the workability decrease. Accordingly, in the case of adding W, the W content is 0.5% or less, and preferably 0.4% or less. Although no lower limit is placed on the W content, the W content is preferably 0.01% or more from the viewpoint of achieving sufficient effect by addition of W.

V: 0.50% or Less

V is an element that has an effect of increasing the strength of the steel by forming carbide. V also has an effect of improving the temper softening resistance. If the V content is more than 0.50%, not only the effects are saturated, but also the workability decreases. Accordingly, in the case of adding V, the V content is 0.50% or less, and preferably 0.40% or less. Although no lower limit is placed on the V content, the V content is preferably 0.001% or more and more preferably 0.002% or more from the viewpoint of achieving sufficient effect by addition of V.

Mo: 2.0% or Less

Mo is an element that improves the hardenability, and is effective in improving the strength and fatigue strength of the steel. If the Mo content is more than 2.0%, the workability decreases considerably. Accordingly, in the case of adding Mo, the Mo content is 2.0% or less, and preferably 0.5% or less. Although no lower limit is placed on the Mo content, the Mo content is preferably 0.001% or more and more preferably 0.002% or more from the viewpoint of achieving sufficient effect by addition of Mo.

In another one of the disclosed embodiments, the chemical composition may optionally further contain REM (rare-earth metal) in the amount described below.

REM: 0.020% or Less

REM is an element that makes nonmetallic inclusions spherical in form and is effective in reducing crack initiation points upon fatigue fracture in such a use environment in which stress is applied repeatedly. If the REM content is more than 0.020%, the amount of inclusions increases excessively, and the cleanliness decreases. Accordingly, in the case of adding REM, the REM content is 0.020% or less. Although no lower limit is placed on the REM content, the REM content is preferably 0.0020% or more from the viewpoint of achieving sufficient effect by addition of REM.

An electric resistance welded steel pipe or tube according to one of the disclosed embodiments may have a chemical composition containing (consisting of), in mass %, C: 0.40% to 0.55%, Si: 0.10% to 1.0%, Mn: 0.10% to 2.0%, P: 0.10% or less, S: 0.010% or less, Al: 0.010% to 0.100%, Cr: 0.05% to 0.30%, Ti: 0.010% to 0.050%, B: 0.0005% to 0.0030%, Ca: 0.0001% to 0.0050%, N: 0.0005% to 0.0050%, optionally one or both of Cu: 1.0% or less and Ni: 1.0% or less, optionally one or more selected from the group consisting of Nb: 0.05% or less, W: 0.5% or less, V: 0.50% or less, and Mo: 2.0% or less, and optionally REM: 0.020% or less, with the balance consisting of Fe and inevitable impurities.

[Ferrite Decarburized Layer]

The electric resistance welded steel pipe or tube according to one of the disclosed embodiments has a ferrite decarburized layer with a depth of 20 μm to 50 μm at its surface. If the ferrite decarburized layer depth is less than 20 μm, quench cracks occur during quenching, as mentioned earlier. To prevent quench cracks, the ferrite decarburized layer depth is limited to 20 μm or more. If the ferrite decarburized layer depth is more than 50 μm, no quench cracks occur, but the strength and the fatigue strength as parts cannot be ensured due to insufficient quenching hardness of the surface layer. Although one way of ensuring the strength and the fatigue strength is to cut the decarburized portion of the surface layer, this leads to significantly higher costs. The ferrite decarburized layer depth is therefore 50 μm or less, and preferably 40 μm or less.

[t/D]

The dimensions of the electric resistance welded steel pipe or tube according to one of the disclosed embodiments are not limited, and may be any dimensions. The ratio t/D of the thickness t (mm) to the outer diameter D (mm) of the steel pipe or tube is preferably 10% to 35%.

[Microstructure]

The present disclosure is based on the concept that quench cracks are prevented by providing a ferrite decarburized layer of a specific depth in a surface layer of a steel pipe or tube. Hence, the presently disclosed techniques can be applied to an electric resistance welded steel pipe or tube of any microstructure without limitation. For example, the electric resistance welded steel pipe or tube preferably has microstructure composed of ferrite and pearlite, or microstructure composed of ferrite, pearlite, and bainite. In other words, the electric resistance welded steel pipe or tube according to one of the disclosed embodiments may have microstructure including ferrite and pearlite and optionally including bainite.

[Vickers Hardness after Heat Treatment]

The electric resistance welded steel pipe or tube according to one of the disclosed embodiments is used after quenched and tempered. The post quenching-tempering Vickers hardness is not limited. In the case of using the steel pipe or tube in automotive parts and the like, the post quenching-tempering Vickers hardness is preferably 350 HV or more. From the viewpoint of suppressing toughness degradation and delayed fracture, the post quenching-tempering Vickers hardness is preferably 700 HV or less. Since the hardness of the outermost surface layer does not increase by quenching, in the case where this affects the fatigue strength, the portion may be removed by cutting or the like.

[Production Method]

The electric resistance welded steel pipe or tube described above can be produced, for example, by sequentially performing the following (1) to (5), without being limited thereto:

(1) continuously roll forming a steel strip having the foregoing chemical composition to obtain an approximately cylindrical formed body;

(2) butting and electric resistance welding the circumferential ends of the formed body to obtain a steel pipe or tube (element pipe or tube);

(3) heating the steel pipe or tube;

(4) subjecting the heated steel pipe or tube to hot diameter-reducing rolling; and (5) cooling the steel pipe or tube after the hot diameter-reducing rolling.

As the steel strip, any of a hot-rolled steel strip and a cold-rolled steel strip may be used. The roll forming, the electric resistance welding, and the heating are not limited, and may be performed by any methods. The electric resistance welding is preferably performed by a high-frequency electric resistance welding method.

The hot diameter-reducing rolling and the subsequent cooling are not limited, and may be performed by any methods. An example of preferred production conditions will be given below.

[Heating Temperature]

The heating temperature of the element pipe or tube before the diameter-reducing rolling is preferably Ac3 point or more. If the heating temperature is less than Ac3 point, the toughness of the electric resistance weld portion decreases, and also the homogenization of the C content in the white layer is slow. The heating temperature is preferably 1000° C. or less. If the heating temperature is more than 1000° C., the surface characteristics of the product degrade.

[Diameter-Reducing Rolling Finish Temperature]

The diameter-reducing rolling finish temperature is preferably more than 700° C. If the diameter-reducing rolling finish temperature is 700° C. or less, the ductility decreases due to processing strain. The diameter-reducing rolling finish temperature is preferably 950° C. or less. If the diameter-reducing rolling finish temperature is more than 950° C., the surface characteristics of the steel pipe or tube degrade, and also the productivity decreases.

[Cumulative Diameter Reduction Rate]

The cumulative diameter reduction rate in the diameter-reducing rolling is preferably 80% or less. If the cumulative diameter reduction rate is more than 80%, the strain hardening of the entire material increases, and not only the ductility decreases but also the productivity decreases.

In the hot diameter-reducing rolling and the cooling, the, dwelling time in the ferrite-austenite dual phase region needs to be controlled so that the ferrite decarburized layer depth at the surface of the eventually obtained electric resistance welded steel pipe or tube will be 20 μm to 50 μm. Herein, the term "dwelling time in the ferrite-austenite dual phase region" denotes the time during which the steel pipe or tube is in the austenite-ferrite ($\gamma$-$\alpha$) dual phase region during the hot diameter-reducing rolling and the subsequent cooling, as mentioned above.

Furthermore, to achieve the ferrite decarburized layer depth of 20 μm to 50 μm with such a dwelling time in the ferrite-austenite dual phase region that allows on-line production, the preliminary decarburized layer depth needs to be 5 μm or more, as mentioned above. Herein, the term "preliminary decarburized layer depth" denotes the depth of the decarburized layer formed as a result of the heating before the diameter-reducing rolling, as mentioned above.

It is important to optimize the conditions of the heating before the diameter-reducing rolling, in order to adjust the preliminary decarburized layer depth to the appropriate range (i.e., 5 μm or more). The depth of the decarburized layer can be adjusted by controlling the heating temperature and the heating time. To control the heating time, the pipe or tube passing speed in the production line needs to be changed. Reducing the pipe or tube passing speed in order to increase the thickness of the decarburized layer leads to a decrease in productivity and surface roughening of the steel pipe or tube. Hence, it is desirable to control the heating temperature in order to achieve the preliminary decarburized layer depth of 5 μm or more without decreasing the productivity. Specifically, the heating temperature in the heating before the diameter-reducing rolling is preferably 860° C. or more. If the heating temperature is more than 1000° C., the ferrite decarburized layer in the eventually obtained electric resistance welded steel pipe or tube is excessively thick, causing insufficient quenching. Hence, the heating temperature is preferably 1000° C. or less.

Examples

More detailed description will be given below by way of examples. The following examples merely represent preferred examples, and the present disclosure is not limited to these examples.

Hot-rolled steel strips (thickness: 4.3 mm) having the chemical compositions listed in Table 2 were each continuously cold formed using a plurality of rolls, to obtain an approximately cylindrical open pipe or tube. The circumferential ends of the open pipe or tube were then butted and pressed against each other, and electric resistance welded by a high-frequency electric resistance welding method to obtain a steel pipe or tube (outer diameter: 89.1 mmφ, thickness: 4.3 mm).

Further, the obtained steel pipe or tube was heated to 930° C. by an induction heater. Here, the heating temperature was changed in a range of 900° C. to 950° C., in order to change the preliminary decarburized layer depth. After this, the steel pipe or tube was subjected to hot diameter-reducing rolling to an outer diameter of 40 mmφ and a thickness of 4.0 mm by a stretch reducer. Here, the residence time in the dual phase region was changed by changing the pipe or tube passing speed, in order to change the ferrite decarburized layer depth. The steel pipe or tube after the hot diameter-reducing rolling was cooled to approximately 250° C. by air cooling, and then dropped into a water tank and cooled to room temperature.

The ferrite decarburized layer depth at each of the outer surface and the inner surface of the electric resistance welded steel pipe or tube obtained as a result of the above-described procedure was measured in accordance with JIS G 0558. The measurement was performed at four points with 90° intervals in the circumferential direction starting from the weld portion, and an average value of the measurement values at the four points was used. The measurement results are listed in Table 3.

Subsequently, the electric resistance welded steel pipe or tube was quenched under the following conditions, to evaluate the quench crack resistance. The electric resistance welded steel pipe or tube was first held at 950° C. for 20 min in a vacuum furnace, and then promptly immersed in a water tank in a sufficiently stirred state and quenched. The cooling rate in the quenching was measured using a thermocouple attached to the electric resistance welded steel pipe or tube as a sample. The cooling rate from 900° C. to 200° C. in the water quenching was 50° C./s or more.

After this, the appearance and section of the pipe or tube were observed using an optical microscope, to determine whether quench cracks occurred. The results of determining whether quench cracks occurred are listed in Table 3.

Next, each electric resistance welded steel pipe or tube that developed no quench cracks was tempered at 400° ° C. for 20 min. For comparison, a reference sample was produced by grinding the pipe or tube from each of the outer and inner surfaces by a thickness of 1.0 mm to remove the affected portion of the surface decarburized layer. A torsional fatigue test was then conducted, and the fatigue strength of each of the electric resistance welded steel pipe or tube as-tempered which was not subjected to surface grinding and the reference sample was measured. The decrease rate of the fatigue strength of the electric resistance welded steel pipe or tube as-tempered with respect to the fatigue strength of the reference sample was calculated. The calculated decrease rate is indicated in Table 3 as the fatigue strength decrease rate.

As can be seen from Table 3, in the case where the ferrite decarburized layer depth was 20 μm or more, no quench cracks occurred. In the case where the ferrite decarburized layer depth was less than 20 μm, quench cracks occurred. In the case where the ferrite decarburized layer depth was more than 50 μm, no quench cracks occurred but the fatigue strength decrease rate was considerably high.

TABLE 2

| Steel sample ID | Chemical composition (mass %) * | | | | | | | | | |
|---|---|---|---|---|---|---|---|---|---|---|
| | C | Si | Mn | P | S | Al | N | Cr | Ti | B |
| A | 0.41 | 0.22 | 1.53 | 0.018 | 0.0050 | 0.0300 | 0.0035 | 0.20 | 0.012 | 0.0020 |
| B | 0.45 | 0.22 | 1.53 | 0.018 | 0.0050 | 0.0300 | 0.0035 | 0.20 | 0.015 | 0.0018 |
| C | 0.54 | 0.22 | 0.20 | 0.018 | 0.0050 | 0.0400 | 0.0035 | 0.20 | 0.015 | 0.0015 |
| D | 0.48 | 0.22 | 1.10 | 0.018 | 0.0050 | 0.0300 | 0.0035 | 0.20 | 0.015 | 0.0020 |
| E | 0.42 | 0.15 | 1.53 | 0.018 | 0.0050 | 0.0300 | 0.0035 | 0.25 | 0.015 | 0.0020 |
| F | 0.42 | 0.40 | 1.80 | 0.018 | 0.0050 | 0.0300 | 0.0035 | 0.20 | 0.035 | 0.0020 |
| G | 0.42 | 0.80 | 1.53 | 0.018 | 0.0050 | 0.0400 | 0.0035 | 0.05 | 0.015 | 0.0015 |
| H | 0.42 | 0.22 | 1.10 | 0.018 | 0.0050 | 0.0700 | 0.0035 | 0.20 | 0.040 | 0.0030 |
| I | 0.42 | 0.22 | 1.10 | 0.018 | 0.0050 | 0.0450 | 0.0035 | 0.20 | 0.015 | 0.0030 |
| J | 0.42 | 0.22 | 1.80 | 0.018 | 0.0050 | 0.0300 | 0.0035 | 0.20 | 0.015 | 0.0020 |
| K | 0.40 | 0.22 | 1.53 | 0.018 | 0.0050 | 0.0300 | 0.0035 | 0.10 | 0.015 | 0.0020 |
| L | 0.42 | 0.22 | 1.53 | 0.018 | 0.0050 | 0.0300 | 0.0035 | 0.20 | 0.015 | 0.0020 |
| M | 0.39 | 0.22 | 1.53 | 0.018 | 0.0050 | 0.0300 | 0.0035 | 0.20 | 0.035 | 0.0020 |
| N | 0.56 | 0.22 | 1.52 | 0.018 | 0.0050 | 0.0300 | 0.0035 | 0.20 | 0.015 | 0.0020 |

| Steel sample ID | Chemical composition (mass %) * | | | | | | | | |
|---|---|---|---|---|---|---|---|---|---|
| | Mo | W | Nb | V | Ni | Cu | Ca | REM | Remarks |
| A | — | — | — | — | — | — | 0.0012 | — | Conforming steel |
| B | — | — | — | — | — | — | 0.0012 | — | Conforming steel |
| C | — | — | — | — | — | — | 0.0012 | — | Conforming steel |
| D | — | — | — | — | — | — | 0.0012 | — | Conforming steel |
| E | — | — | — | — | — | — | 0.0012 | — | Conforming steel |
| F | — | — | — | — | — | — | 0.0012 | — | Conforming steel |
| G | — | — | — | — | — | — | 0.0012 | — | Conforming steel |
| H | — | — | — | — | — | — | 0.0012 | — | Conforming steel |
| I | 0.10 | 0.1 | — | — | — | — | 0.0012 | — | Conforming steel |
| J | — | — | 0.01 | 0.10 | — | — | 0.0012 | — | Conforming steel |
| K | — | — | — | — | 0.10 | 0.1 | 0.0012 | — | Conforming steel |
| L | — | — | — | — | — | — | 0.0012 | 0.0010 | Conforming steel |
| M | — | — | — | — | — | — | 0.0012 | — | Comparative steel |
| N | — | — | — | — | — | — | 0.0012 | — | Comparative steel |

* balance consisting of Fe and inevitable impurities

TABLE 3

| No. | Steel sample ID | Preliminary decarburized layer depth (μm) Pipe or tube outer surface | Preliminary decarburized layer depth (μm) Pipe or tube inner surface | Ferrite decarburized layer depths (μm) Pipe or tube outer surface | Ferrite decarburized layer depths (μm) Pipe or tube inner surface | Quench crack | Fatigue strength decrease rate (%) | Remarks |
|---|---|---|---|---|---|---|---|---|
| 1 | A | 2 | 3 | 15 | 16 | Occurred | 55 | Comparative Example |
| 2 | A | 6 | 6 | 20 | 21 | Not occurred | 1 | Example |
| 3 | A | 7 | 8 | 30 | 32 | Not occurred | 2 | Example |
| 4 | A | 8 | 7 | 45 | 47 | Not occurred | 3 | Example |
| 5 | A | 20 | 21 | 55 | 53 | Not occurred | 54 | Comparative Example |
| 6 | B | 6 | 7 | 20 | 22 | Not occurred | 2 | Example |
| 7 | B | 7 | 6 | 35 | 36 | Not occurred | 1 | Example |
| 8 | C | 8 | 6 | 25 | 26 | Not occurred | 1 | Example |
| 9 | C | 6 | 7 | 46 | 48 | Not occurred | 3 | Example |
| 10 | D | 7 | 8 | 30 | 32 | Not occurred | 2 | Example |
| 11 | D | 8 | 9 | 48 | 47 | Not occurred | 2 | Example |
| 12 | E | 8 | 6 | 23 | 26 | Not occurred | 3 | Example |
| 13 | E | 9 | 7 | 48 | 49 | Not occurred | 4 | Example |
| 14 | F | 6 | 7 | 22 | 29 | Not occurred | 1 | Example |
| 15 | F | 10 | 8 | 46 | 47 | Not occurred | 3 | Example |
| 16 | G | 5 | 9 | 23 | 40 | Not occurred | 2 | Example |
| 17 | G | 10 | 10 | 48 | 46 | Not occurred | 2 | Example |
| 18 | H | 9 | 8 | 46 | 48 | Not occurred | 4 | Example |
| 19 | H | 8 | 9 | 41 | 48 | Not occurred | 4 | Example |
| 20 | I | 9 | 7 | 25 | 26 | Not occurred | 2 | Example |
| 21 | I | 4 | 4 | 18 | 18 | Occurred | 56 | Comparative Example |
| 22 | J | 6 | 5 | 24 | 28 | Not occurred | 3 | Example |
| 23 | J | 25 | 26 | 52 | 54 | Not occurred | 55 | Comparative Example |
| 24 | K | 8 | 8 | 30 | 32 | Not occurred | 2 | Example |
| 25 | K | 1 | 1 | 10 | 6 | Occurred | 52 | Comparative Example |
| 26 | L | 2 | 2 | 15 | 8 | Occurred | 59 | Comparative Example |
| 27 | M | 2 | 2 | 15 | 8 | Occurred | 59 | Comparative Example |
| 28 | N | 4 | 3 | 15 | 8 | Occurred | 59 | Comparative Example |

The invention claimed is:

1. An electric resistance welded steel pipe or tube comprising:
a chemical composition containing, in mass %,
C: 0.40% to 0.55%,
Si: 0.10% to 1.0%,
Mn: 0.10% to 2.0%,
P: 0.10% or less,
S: 0.010% or less,
Al: 0.010% to 0.100%,
Cr: 0.05% to 0.30%,
Ti: 0.010% to 0.050%,
B: 0.0005% to 0.0030%,
Ca: 0.0001% to 0.0050%, and
N: 0.0005% to 0.0050%,
with a balance consisting of Fe and inevitable impurities;
a microstructure composed of ferrite and pearlite, or a microstructure composed of ferrite, pearlite, and bainite; and
a ferrite decarburized layer at each of an outer surface and an inner surface, the ferrite decarburized layer having a depth of 20 μm to 50 μm from the surface.

2. The electric resistance welded steel pipe or tube according to claim 1, wherein the chemical composition further contains, in mass %, one or both of
Cu: 1.0% or less, and
Ni: 1.0% or less.

3. The electric resistance welded steel pipe or tube according to claim 1, wherein the chemical composition further contains, in mass %, one or more selected from the group consisting of
Nb: 0.05% or less,
W: 0.5% or less,
V: 0.50% or less, and
Mo: 2.0% or less.

4. The electric resistance welded steel pipe or tube according to claim 1, wherein the chemical composition further contains, in mass %,
Rare Earth Metal (REM): 0.020% or less.

5. The electric resistance welded steel pipe or tube according to claim 2, wherein the chemical composition further contains, in mass %, one or more selected from the group consisting of
Nb: 0.05% or less,
W: 0.5% or less,
V: 0.50% or less, and
Mo: 2.0% or less.

6. The electric resistance welded steel pipe or tube according to claim 2, wherein the chemical composition further contains, in mass %,
Rare Earth Metal (REM): 0.020% or less.

7. The electric resistance welded steel pipe or tube according to claim 3, wherein the chemical composition further contains, in mass %,
Rare Earth Metal (REM): 0.020% or less.

8. The electric resistance welded steel pipe or tube according to claim 5, wherein the chemical composition further contains, in mass %,
Rare Earth Metal (REM): 0.020% or less.

* * * * *